US006972931B2

(12) United States Patent
Rudi et al.

(10) Patent No.: US 6,972,931 B2
(45) Date of Patent: Dec. 6, 2005

(54) WRITE/READ HEAD ASSEMBLY WITH WEAR PARTS

(75) Inventors: Guttorm Rudi, Fjellhamar (NO); Ladislav Rubas, Tranby (NO); Cliff Miyamoto, Arroyo Grande, CA (US)

(73) Assignee: Tandberg Data ASA, Oslo (NO)

( * ) Notice: Subject to any disclaimer, the term of this patent is extended or adjusted under 35 U.S.C. 154(b) by 377 days.

(21) Appl. No.: 10/238,090

(22) Filed: Sep. 10, 2002

(65) Prior Publication Data

US 2004/0047076 A1    Mar. 11, 2004

(51) Int. Cl.$^7$ .............................................. G11B 5/10
(52) U.S. Cl. .................... 360/241; 360/241.1
(58) Field of Search .............................. 360/241, 241.1, 360/241.2, 241.3, 241.4, 241.5, 126

(56) References Cited

U.S. PATENT DOCUMENTS

| | | | |
|---|---|---|---|
| 4,539,615 A | * | 9/1985 | Arai et al. ................... 360/121 |
| 4,967,300 A | * | 10/1990 | Reid et al. ................... 360/122 |
| 5,237,476 A | * | 8/1993 | Bischoff et al. ............. 360/126 |
| 5,473,486 A | * | 12/1995 | Nepela et al. ............ 360/234.7 |
| 5,737,158 A | * | 4/1998 | Tanaka et al. .......... 360/130.21 |
| 6,118,626 A | | 9/2000 | Müftü et al. |
| 6,151,191 A | | 11/2000 | Müftü et al. |
| 6,282,055 B1 | * | 8/2001 | Lakshmikumaran et al. ..... 360/122 |
| 6,587,305 B2 | * | 7/2003 | Saliba ......................... 360/129 |

FOREIGN PATENT DOCUMENTS

| | | |
|---|---|---|
| EP | 0 977 178 A2 | 2/2000 |
| EP | 0 977 178 A3 | 2/2000 |
| EP | 1 359 577 A2 | 11/2003 |
| GB | 2 276 268 A | 9/1994 |

OTHER PUBLICATIONS

IEEE Transactions on Magnetics vol. 32, No. 5, Sep. 1996, H. Hinteregger and S Müftü, "Contact Tape Recording with a Flat Head Contour", pp. 3476 to 3478, especially p. 3476.

* cited by examiner

Primary Examiner—William Korzuch
Assistant Examiner—Christopher R. Magee
(74) Attorney, Agent, or Firm—Schiff Hardin LLP

(57) ABSTRACT

A read/write head of a magnetic tape drive is provided, where the matrix write head is provided as a part of an overall flat structure that utilizes the atmospheric pressure to hold the tape against the operational surface of the write head. The read head portion is provided to enable reading of the data immediately after it is written. The present head structure permits writing and reading of written data in both tape travel directions. The matrix write head portions are on chips and wear parts are in the upstream direction with respect to the tape travel from the write head. The wear parts provide a shape edge over which the tape moves. The read head is either optical or magnetic and is between two portions of the write head.

2 Claims, 8 Drawing Sheets

TAPE MOVEMENT DIRECTION

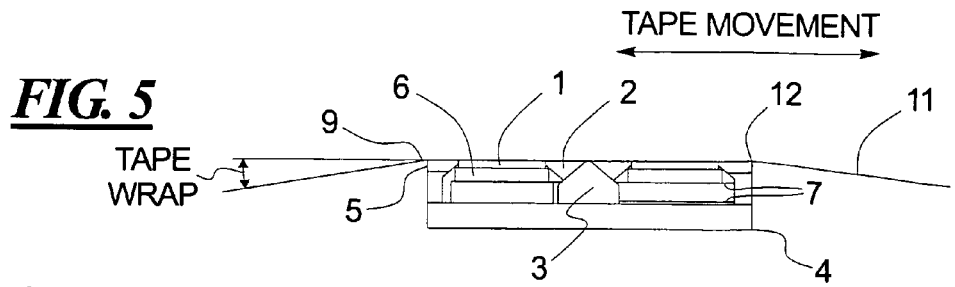
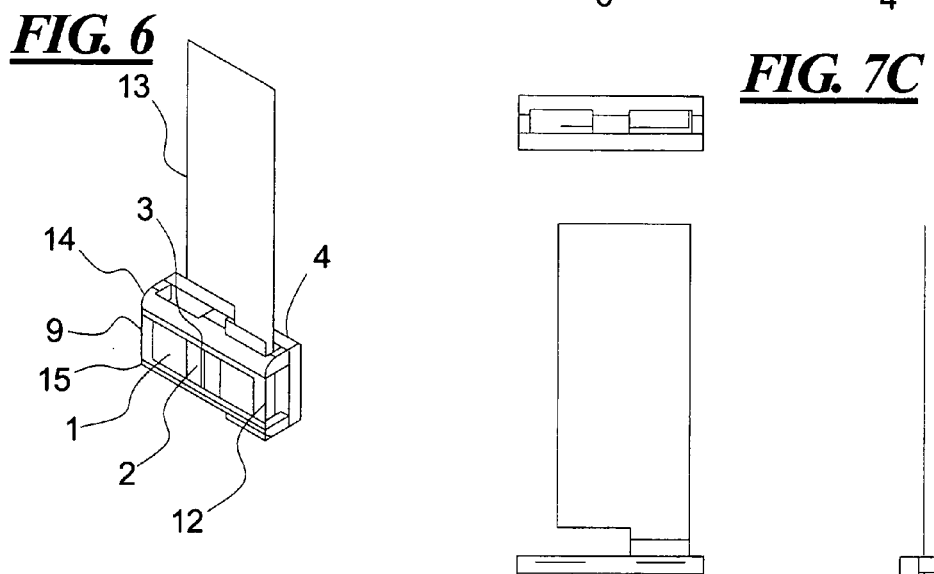
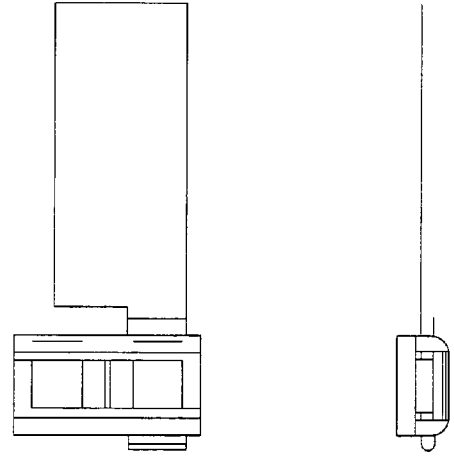
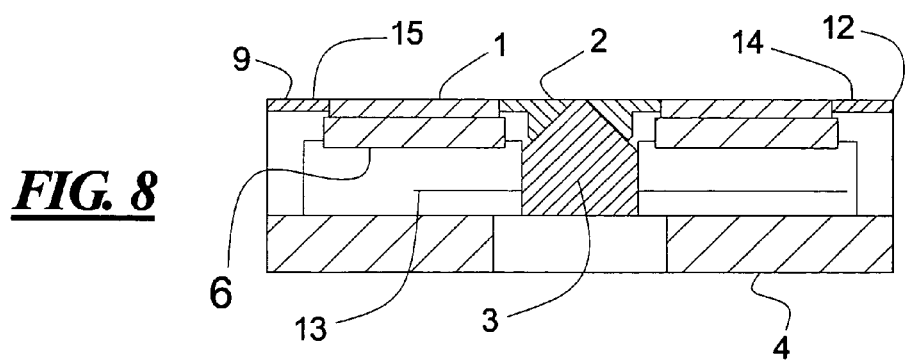

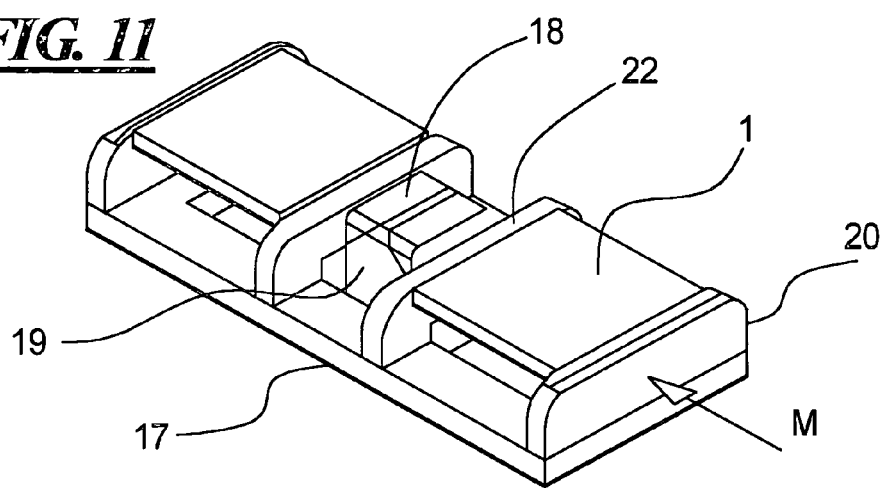
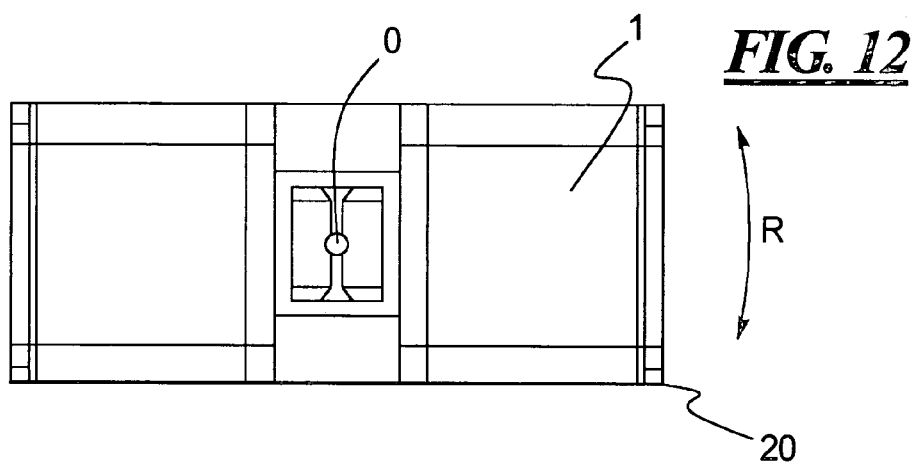
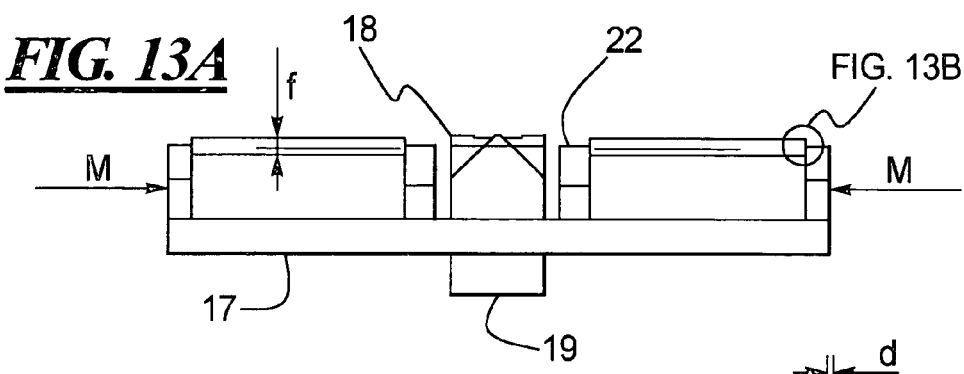
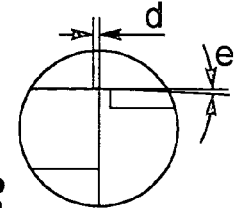

WRITE/READ HEAD ASSEMBLY WITH WEAR PARTS

BACKGROUND OF THE INVENTION

1. Field of the Invention

The present invention relates generally to a head assembly for reading, reproducing and/or erasing information in a track of a flexible tape media. This invention is in particular directed to a read/write head having an approximately flat head to tape contact surface where the atmospheric pressure creates the necessary head to tape spacing.

2. Description of the Related Art

The trend in data storage is to provide higher capacity, faster access and increased data transfer rates. To obtain an optimum performance in writing to and reading from a flexible tape media, it is necessary that the head is kept in close and stable contact to the tape media surface. A robust system requires a head to tape spacing which is not very sensitive to variations of tape speed or tape tension.

Access time to data can be highly improved (reduced) by utilization of wider and shorter tape media. When using wide tape, the read/write head width is significantly narrower than the tape width, which again puts new requirements on the head to tape contact area. The data transfer rate can be improved by writing and reading an increased number of tracks in parallel. This again leads to new types of heads, such as matrix write heads and optical readout heads. In order to reduce costs, matrix write heads are made as flat silicon chips in a wafer manufacturing process.

The conventional way to achieve head to tape contact is to make the head contour curved around the gap area and wrap the tape around this curve and thereby concentrate the tape pressure close to the active gap area (for example, using a high pressure contour). This is not possible with a matrix head where the head gaps are spread over a flat surface area. In a matrix head, the head to tape spacing must be controlled over a flat surface.

SUMMARY OF THE INVENTION

The present invention builds on the principle that a tape can be pushed down to a flat surface by atmospheric pressure after passing over a relatively sharp edge. A flat contour head is provided with relatively sharp edges in the tape movement direction in order to obtain the necessary head to tape spacing and positional stability.

BRIEF DESCRIPTION OF THE DRAWINGS

FIG. 5 is a schematic side view of the head showing the tape wrap;

FIG. 6 is a perspective view of a second embodiment of the read/write head of the invention;

FIGS. 7A, 7B, 7C and 7D are front, top, bottom and side views, respectively, of the second embodiment of FIG. 6;

FIG. 8 is a cross sectional view along lines B—B of FIG. 7A;

FIG. 11 is a perspective view of the head frame and tape contact surfaces of the third embodiment;

FIG. 12 is a plan view of the third embodiment of the read/write head showing a rotation direction;

FIG. 13A is a side elevational view of the third embodiment of the read/write head illustrating level distances of the elements thereof;

FIG. 13B is an enlarged view of a portion of the read/write head of FIG. 13A;

FIG. 16 is a perspective view of a non-optical read/write head according to the present invention;

DETAILED DESCRIPTION OF THE PREFERRED EMBODIMENTS

Using the linear flux density which is common on today's tape media, the distance between write/read gaps and the tape surface should be less than 100 nanometers. In order to increase the linear flux density in the future, this distance must further be reduced. The embodiments of the present invention provide a means to achieve this reduction.

The contour of the flat read/write head preferably does not have any significant protrusions that lift the tape in the critical area or any steps or gaps that leads to air leakage that will lift the tape or create instability in the head to tape distance. The exemplary embodiments provide read while write head configurations, i.e. the written data is verified immediately by the read head. The write heads shown in all of the drawings in this case are planar matrix thin-film heads, but the present invention apply to any type of write head with the gaps placed in a planar tape contact surface.

The part of the read head that is in contact with the tape surface (which here means less than a few nanometers flying distance) is an optical read prism (see FIGS. 1–15). The rest of the optical read system is not shown, as it is well known from other publications. The optical readout prism can be replaced by any other type of read head, for example, having gaps in the planar surface in the tape contact area. As an example, FIG. 16 shows a conventional (inductive or MR (magnetoresistive)) type of read head.

Figure 1A:
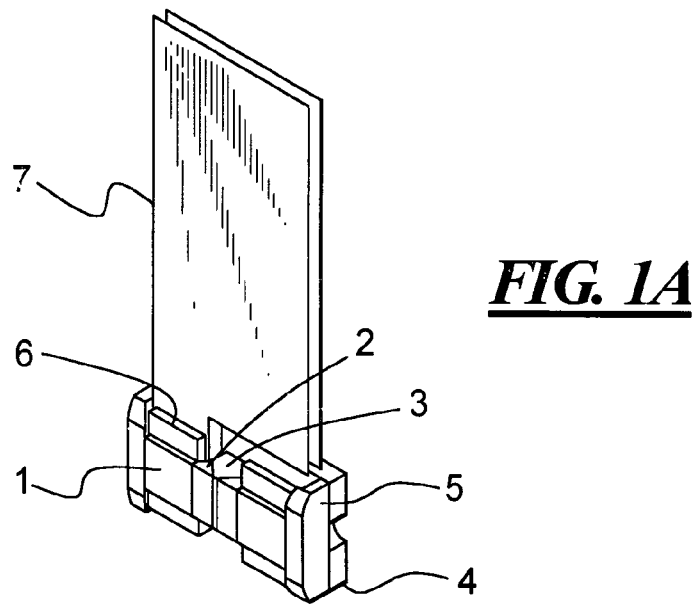
FIG. 1A is a perspective view of a read/write head assembly according to the principles of the present invention.

Referring to FIG. 1A, a read/write head assembly is shown including a matrix write head 1 formed on a silicon chip, a support and wear part 2 glued to an optical read prism 3, and a head assembly base plate 4. Further, a wear part/tape wrap part 5 and an (optional) small printed circuit board 6 connected to a flex cable 7 and the write head 1 on the chip are provided.

The matrix write head 1 is, in a preferred embodiment, formed of thin films applied to a substrate. The thin films permit economical manufacture of the electronics of the write head 1.

The present read/write head assembly is, in one embodiment, a linear read/write head assembly. In other words, it is used for linearly moved magnetic recording media, such as a magnetic tape. The present head assembly is intended for bi-directional operation in that it works equally well in a forward or backward direction. The write head 1 is followed by a read head 3 so that the just written data can be read for verification. A second write head 1 follows the read head 3 in the recording media movement direction. This second write head 1 is preceding the read head 3 when the recording media is run in the reverse direction. The write head which precedes the read head 3 is used, depending on the recording media movement direction. Reverse operation is accomplished by changing the write head which is operated.

The illustrated embodiment is of a write/read/write configuration. It is also within the scope of the present invention to provide a read/write/read configuration, in which the write head portion has a read head on both sides in the tape running direction. In such an embodiment, the single write head is operated at all times for writing, and the read head which follows the write head in the tape movement direction is selected for operation. Thus, this embodiment changes read heads depending on tape movement, as opposed to the previous embodiment which changes write heads depending on tape movement.

The present invention encompasses embodiments of the read/write head which have integral wear parts and/or wear zones as well as embodiments which have separate wear parts from the read/write heads. The read head(s) and write head(s) may also be separated from one another.

It is contemplated in accordance with the present invention to provide outriggers for the present read/write head.

The head assembly of a preferred embodiment is symmetrical with two flex cables (and printed circuit boards), but only one flex cable is shown in the drawing.

Figure 1B:
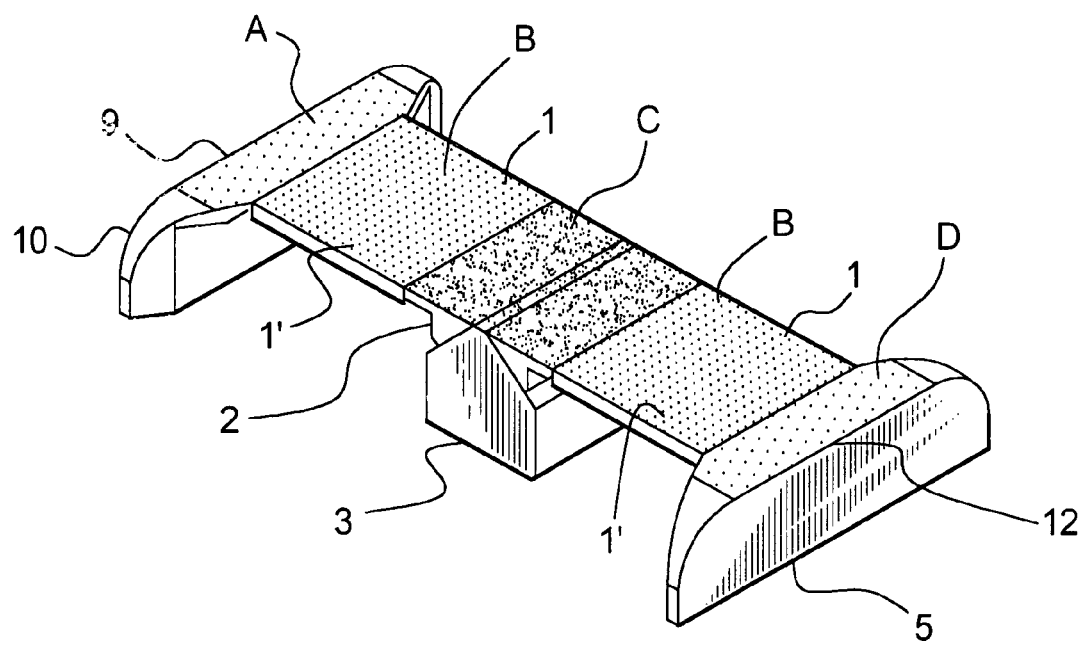
FIG. 1B is an enlarged perspective view of the tape contact surfaces of the read/write head of FIG. 1A.
Figure 2C:
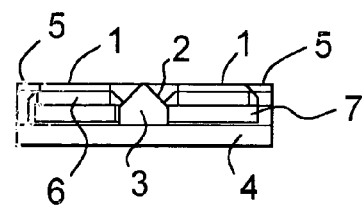
FIGS. 2A, 2B, 2C, and 2D are front, top, bottom and side views of the read/write head of FIG. 1A.
Figure 2A:
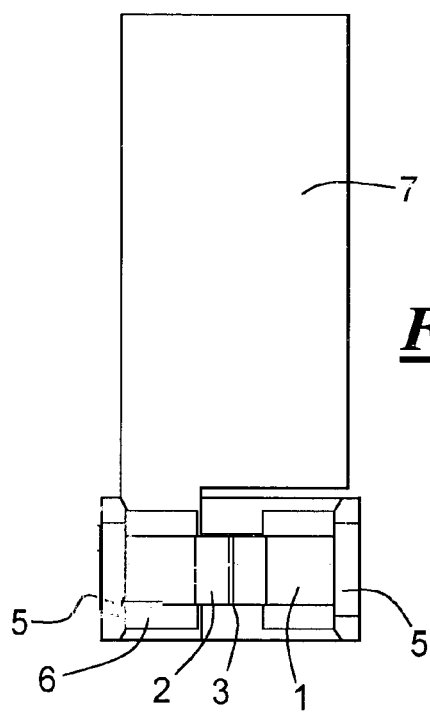
Figure 2D:
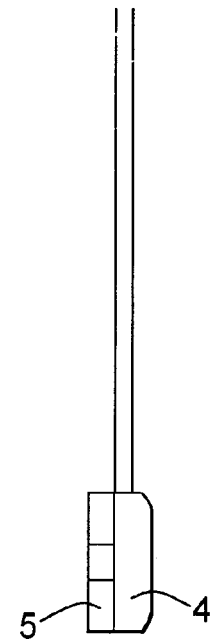
Figure 2B:
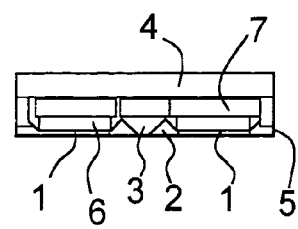

FIG. 1B shows the tape contact surfaces of the read/write head of FIG. 1A, and is one of the many different ways to build a read while write head where all the sensors lie in a planar surface. Other examples are shown in other figures of this application, but are not exhaustive of the possible different constructions. The write elements, which are of a planar matrix type, are semiconductor chips 1 provided with edge wear protecting/tape wrap parts 5. The read sensor of the head is of the optical type and includes a read prism 3 and wear parts/support parts 2.

The coplanar surfaces which are shown in FIG. 1B are formed of planes A and D of the wear parts 5, planes B of the write chips 1 and a plane C of the read prism 3 and the support/wear parts 2. The write chips 1 have a wear coating layer 1' applied at the wafer level, and therefore it is generally not possible to lap these surfaces in order to make them coplanar. The co-planarity of the head assembly is preferably achieved by precision assembly and gluing. Since the typical head to tape spacing is in the range of 40 nanometers, this is a very critical part of the head assembly process. In the mounting process, the planes A, B, C and D are placed on a flat surface and the parts pressed against each other and glue is applied in grooves (See FIG. 3B). The glue viscosity is adapted to the gap size such that the parts are bound together without any glue penetrating out on the critical planar surfaces A, B, C and D. The support/wear parts 2 and the read prism are glued together and the surface C is precision lapped to a planar surface before assembled with the other parts. The precision flat mounting surface can be of glass, so that it is possible by interferometric measurement to check that all the critical surfaces are coplanar before the final gluing process.

On the wear part 5 is a radius 10 that prevents permanent deformation of tape base film as the read/write head moves along the tape during write/read operation. The wear parts 5 each have a tape wrap edge 12 over which the tape travels as it moves.

FIGS. 2A, 2B, 2C, and 2D show the read/write head from various angles, including the base plate 4 with the printed circuit board 6 thereon and the matrix write head 1 mounted on top thereof. The wear parts 5 are on both ends of the head and the optical prism 6 and its supports 2 are between the two parts of the matrix write head 1.

Figure 3A:
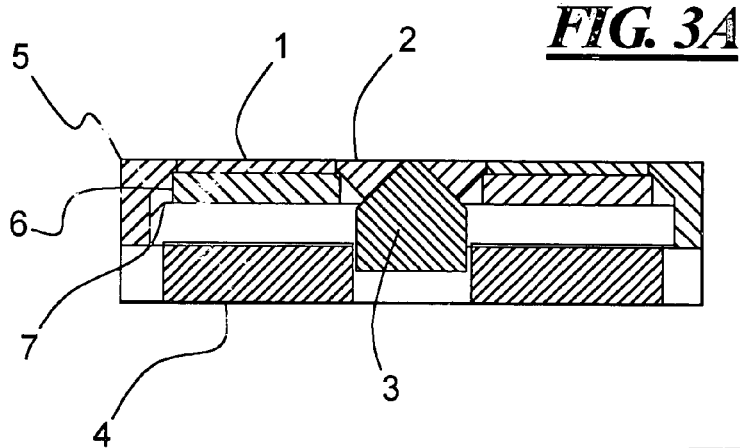
FIG. 3A is a cross section along line A—A of FIG. 2A.

FIG. 3A shows the read/write head assembly in detail, with the optical prism 3 mounted by the supports 2 between the two portions of the matrix write head 1. The supports 2 are glued to the prism 3. Between the base 4 and the write head 1 is the printed circuit board 6 and the flex cable 7. The write head 1 is a silicon chip.

Figure 3B:
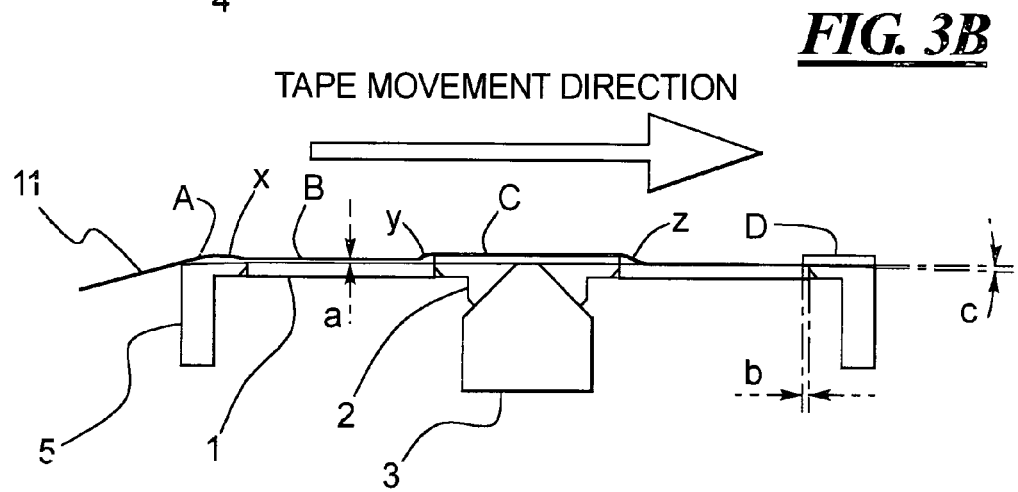
FIG. 3B is a schematic side elevational view showing tape movement over the tape contact surfaces of the read/write head.

In FIG. 3B it is shown that the surfaces A, B, C and D (see FIG. 1B) are not exactly coplanar. Both planes A and D on the wear parts 5 and plane C on the optical read head parts are slightly higher than plane B on the write chip. The read section C formed of the prism 3 and supports 2 protrudes a distance from the write chip surface level B.

On the right side of the figure, it is shown that the wear part 5 protrudes from the write chip surface B and the hatched area shows how this protruding part is removed by lapping at an angle c in order to not damage the critical surface B (shown in FIG. 1A). The distance b is the distance allowed to lap into the write chip surface without damaging the critical write head matrix area.

By performing lapping of the planes A and D at a slight angle such that the critical write chip surface B only will by influenced by a distance b, there will be no step that increases the tape flying height and the sensor area of the chip is not damaged. The area C is kept as is because lapping is not possible without damaging the write chip wear coating and sensors.

A tape 11 is shown and x, y and z shows the tape behaviour as it passes over the substantially flat contour head surface with the described irregularities. As the tape 11 enters the sharp leading edge 9 (see FIG. 1B), the tape lifts slightly (at x) and after that it is pressed down to the surface B by the atmospheric pressure. Further, the tape enters the edge of the protruding level C at an angle in the area y.

The tape 11 is still in contact with the sensor area of the surface B. The protruding edge of surface C performs very much as the leading edge 9, and the tape 11 is still in contact with the critical top part of the read prism 3. The tape 11 is not in contact with the second write chip surface in area z as it leaves the trailing edge of the area C and creates a distance instability over this surface. This is not a problem because this right-most write chip 1 is not in use when the tape moves in the direction showed. The read sensor 3 verifies what is written by the write head 1 close to the leading edge and both of these elements have good head to tape contact. This will work in a comparable way when the tape direction is in reverse and the other, left-most write head 1 is used.

Glue fill is shown between the wear part 5 and the write chip 1 and also between the support and wear part 2 (for the optical read prism 3) and the write chip 1.

Figure 4:
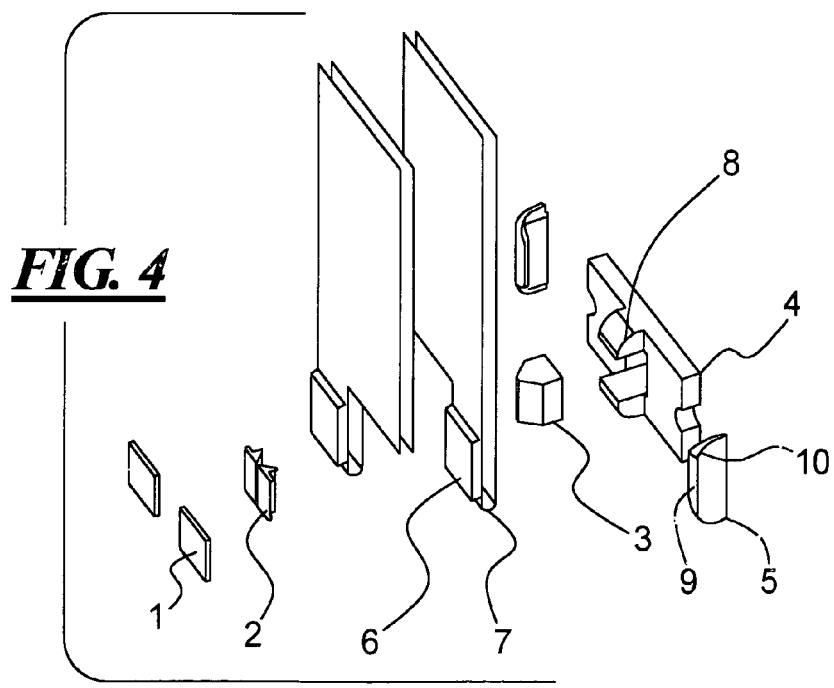
FIG. 4 is an exploded view of the read/write head of FIG. 1A.
Figure 10:
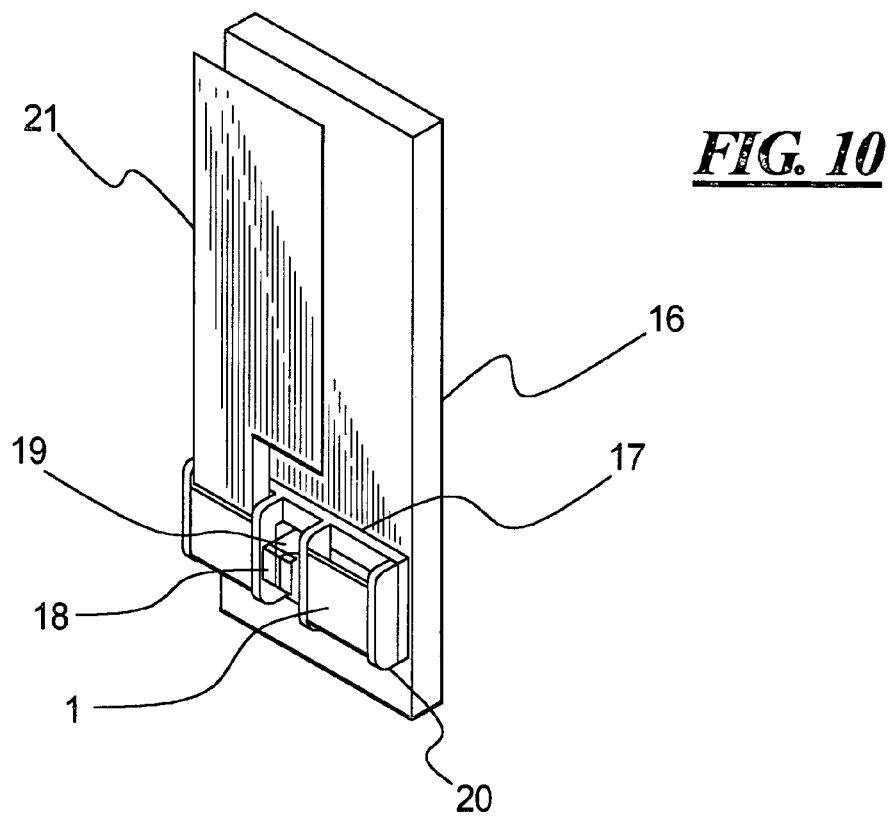
FIG. 10 is a perspective view of a third embodiment of a read/write head according to the invention.

FIG. 4 shows the an exploded view of the assembly where part number denotes 8 small knobs with a radius on one side protruding from the base plate 4. The function of the knobs 8 is to prevent catching of the tape edge when the head assembly moves underneath the tape in a head load or head cleaning sequence, as well as to hold the prism in place. Part number 9 is a sharp edge corresponding to edge 12 in FIGS. 1B and 10 is the radius on the wear part 5.

FIG. 4 shows the two flexible cables 7 used for the present read/write head. Each flex cable 7 is connected to one of the two printed circuit boards 6 beneath the two matrix write heads 1.

FIG. 5 shows a side view of the assembly where the tape 11 is wrapped over the comers 9 and 12 of the wear parts 5. The tape movement direction is shown. In the present invention, the tape is pushed down to the flat surface by the atmospheric pressure after passing over the relatively sharp edge 9 or 12.

As is readily apparent from FIG. 5, the wear parts 5, and in particular, the edges 12 and 9 are subject to wear due to the tape movement thereover and so are formed of wear resistant materials. The parts are preferably treated for additional wear resistance.

FIG. 6 shows a second embodiment where the wear parts are formed like a pair of "shoes" 14 and 15 that completely surround the write chips 1 and the optical part 3. The leading and trailing edges of the wear parts are shown as 9 and 12. Only one flex cable 13 is shown.

One alternate possibility is to eliminate the part of the shoes 14 and 15 that contains the leading and trailing edges 9 and 12, and have the edge wear function integrated in the write chip (for example by being made at the wafer process level as several layers of wear resistant material).

FIGS. 7A, 7B, 7C and 7D show a front, top, bottom and side view of the read/write head assembly of the second embodiment. The outer wear parts are formed like "shoes" 14 and 15

FIG. 8 shows the section view along line B—B of FIG. 7A with the portions of the shoes 14 and 15 indicated.

Figure 9:
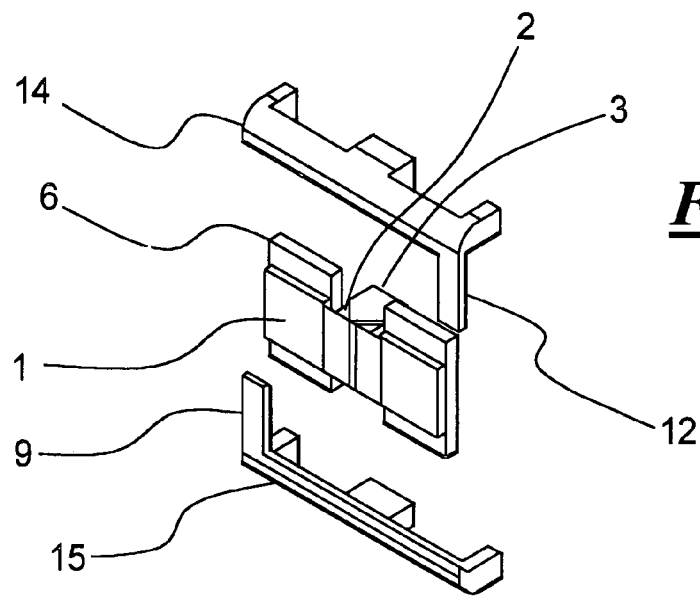
FIG. 9 is an exploded view in perspective of portions of the second embodiment.

FIG. 9 is an exploded view of the wear parts 14 and 15 with the respective tape wrap edges 9 and 12, the write chips 1, the support and wear parts 2 for the optical read prism 3, and the small printed circuit boards 6 (optional). The wear parts 14 and 15 wrap around the chips 1.

FIG. 10 shows an embodiment where the write chips 1 are held in wear bars 20 that are mounted to a head frame 17. The third embodiment of the read/write head assembly is free to move or rotate relative to a readout prism 19, which is held by wear/support parts 18. The head assembly is mounted on a head platform 16 onto which the readout prism is mounted. Part number 21 is a flex cable directly soldered to the write chip pads. The write chips are mounted to a head frame that can rotate about a center O. This means that the write head azimuth can be adjusted dynamically without influencing the optical read alignment.

Since the write heads are rotatable relative to the head platform 16, azimuth errors are compensated. It is also possible to move the head in the transverse direction relative to the tape movement to verify written tracks. This movement follows the lateral movement of the written tracks during the read operation.

FIG. 11 shows the head frame 17 provided with ribs 22 between the write chips 1 and the read out prism 19. A mounting force M is indicated to show force direction against the wear bar 20 by movement of the tape.

FIG. 12 shows the rotational center O on the "ground" part and R is the rotational direction around the rotational center O.

FIG. 13A shows the level distance f between the chip 1 surface and the top surface of the head frame rib 22. The mounting details of the ribs 22 on the head frame 17 are shown. The top level of the ribs 22 lies below the critical surface of the write chip 1. The read prism 19 and the wear/support parts 18 define in this case the critical top level which is above the critical surface of the write chip, but these parts are mounted to the head platform and are not a part of the write chip assembly process.

During mounting, the critical write chip surface is placed on a precision flat surface. The reference ribs 22 are kept at distance f and the top of the wear bars 20 are placed on the precision surface (or slightly protruding). A force is applied in the M direction and the write chip edge is pressed against the reference rib 22 by the wear bar 20. Glue can be applied before or after mounting. Finally, an eventual step between the top of the wear bar 20 and the write chip surface is leveled out by a lapping process.

Further, e is the lapping angle and d is the distance of the lapping area into the write chip surface.

A detail of the chip 1 and the wear bar 20 is shown in FIG. 13B. This shows how the two parts are aligned by lapping at an angle e and a distance d into the chip 1 surface.

Figure 14:
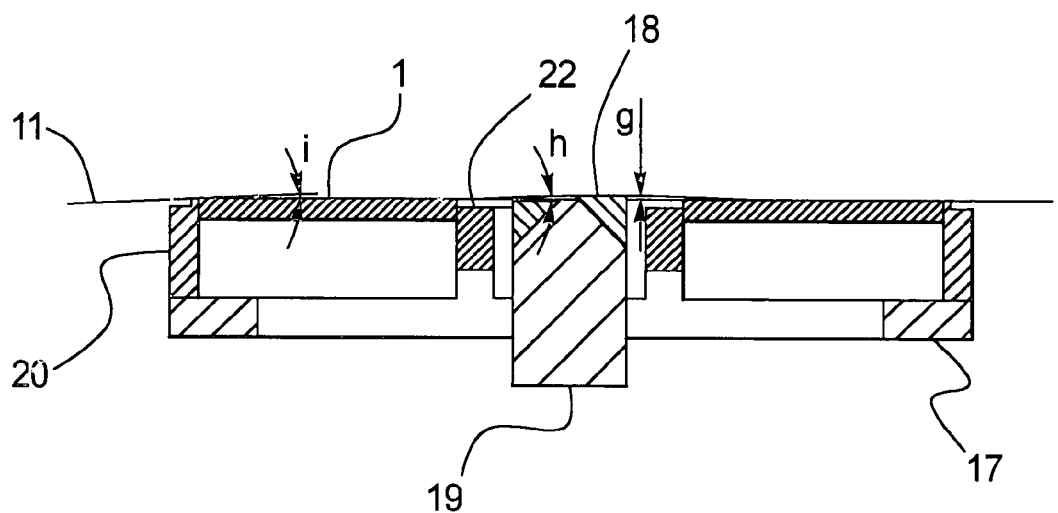
FIG. 14 is a sectional view through the read/write head assembly of FIG. 11 showing the tape-head contact surface.

FIG. 14 is a section through the assembly where the tape 11's interface with the head tape contact surface is shown. The leading edge angle is i, and the tape angle between the chip 1 level and the support/wear part 18 level is h. Further shown is the level distance g between the chip 1 surface and the top surface of readout prism 19 with support/wear parts 18.

The tape behavior is shown in FIG. 14. It is very similar to the description of FIG. 3B above, but in this case the distance between the edge of the write chip and the edge of the support/wear part is significantly increased. This means that the distance g between the critical write chip level and the top of the wear part 18 surface, also is increased. This means that the angle h is not very sensitive to variation in the distance g. A corner radii (see FIG. 11) is necessary on the read part in order not to damage the tape. No corner radii is provided at the leading and trailing edge.

Figure 15:
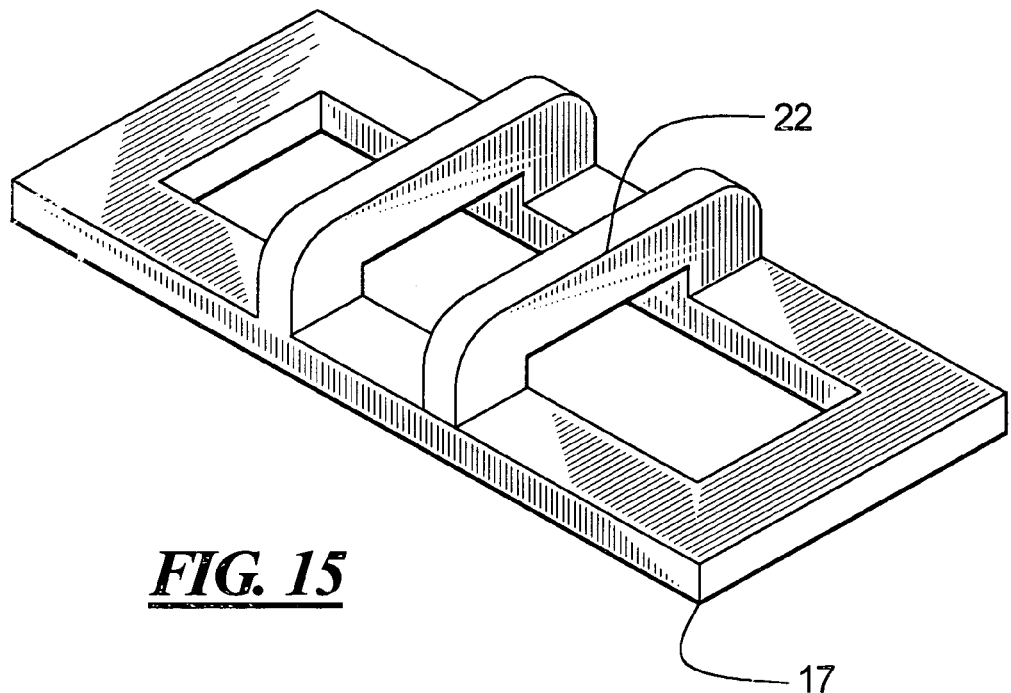
FIG. 15 is a perspective view of the head frame of the third embodiment.
Figure 15:
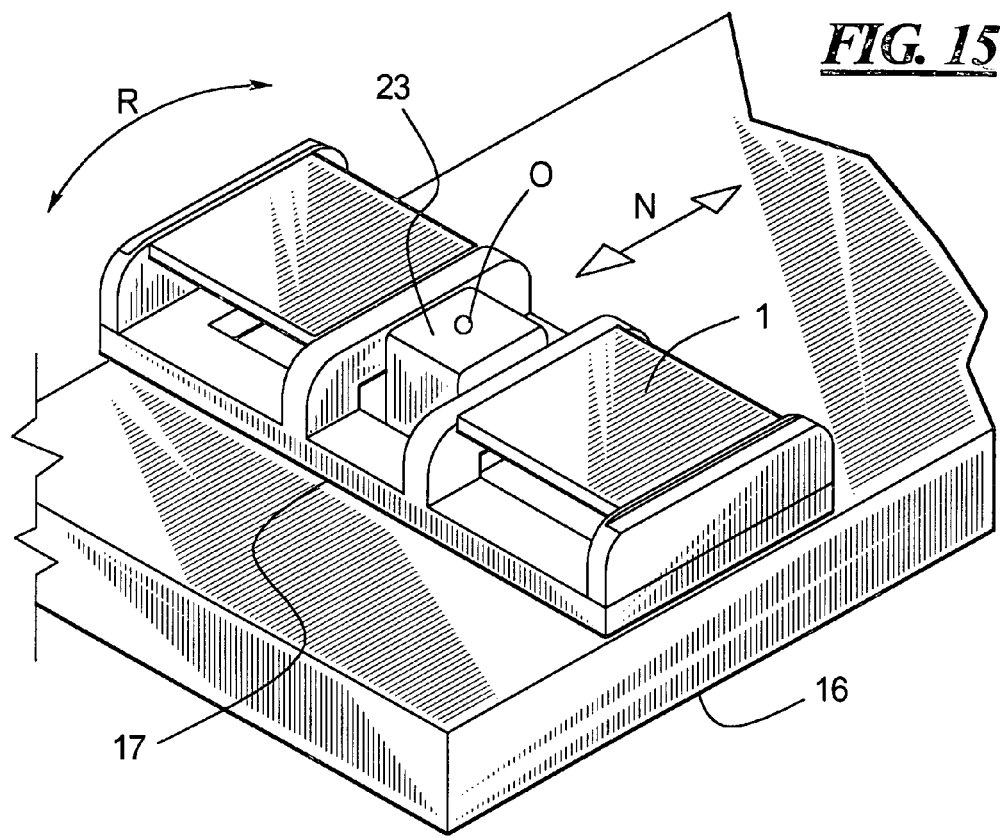

In FIG. 15, the head frame 17 is shown with the head frame ribs 22. The ribs 22 define a space into which the read head is mounted.

FIG. 16 shows an embodiment where the read head 23 is non-optical, i.e. a well known inductive or magneto resistive (MR) type. This head can move in direction N relative to head platform 16. The two write heads 1 are mounted to the head frame 17 and can rotate relative to the head platform 16 about the rotational center O.

I the embodiment where the read head 23 is a conventional MR-type, it is necessary to rotate the write assembly about the rotation center O as mentioned before, but in addition it is necessary to align the read head 23 dynamically in the N-direction in order to verify the written tracks during read while write operation. This movement is also used during read operation in order to dynamically follow the lateral movement of written tracks.

Figure 17:
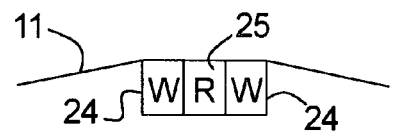
FIG. 17 is a schematic view of a read/write head having a write/read/write configuration.

FIG. 17 shows schematically a read/write head for bi-directional operation which includes two write heads 24 and a single read head 25 positioned therebetween. The write head 24 that precedes the right head 25 in the direction of recording media movement is operated, so that the write head used depends on the direction of recording media movement.

Figure 18:
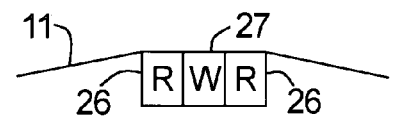
FIG. 18 is a schematic view of a read/write head having a read/write/read configuration.

FIG. 18 illustrates an alternative, wherein two read heads 26 are provided on either side of a write head 27. The read head 26 following the write head 27 in the direction of recording media movement is operated for verification. The read head 26 that is to be operated is thus dependent on the direction of the recording media operation.

Figure 19:
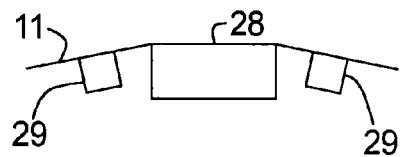
FIG. 19 is a schematic view of a read/write head including outriggers.

FIG. 19 provides a possible alternate configuration for the present invention. In particular, the read/write head 28 is provided with outriggers 29. The outriggers provide a recording media bearing surface which assist in defining an angle of attack by the recording media across the read/write head.

Figure 20:
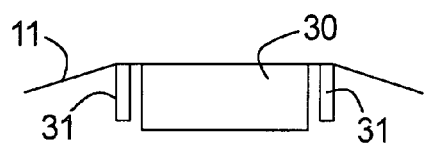
FIG. 20 is a schematic view of a read/write head having separate wear parts.

Although the preceding embodiments have included integral wear parts for the read/write head, it is also contemplated that the wear parts may be separated from the read/write head. For example, FIG. 20 shows a read/write head 30 having wear parts 31 at each side thereof in the recording media travel directions, but spaced therefrom.

Figure 21:
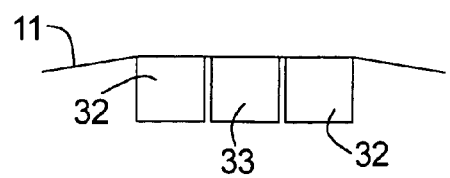
FIG. 21 is a schematic view of a read/write head with separate read heads and write heads.

A further aspect of the present invention provides that read head and the write heads may be separated from one another, as opposed to the integral connection of these parts in the preceding embodiments. FIG. 21 shows a read/write head having a write head 32 that is separated from a read head 33. A second write head 32 is separate from the read head 33 in the other direction, to permit bi-directional operation. It is also contemplate that the separate mounting of these heads may be in a read/write/read configuration as in FIG. 18, as well.

Thus, there is shown and described a read/write head of a magnetic tape drive, where the matrix write head is provided as a part of an overall flat structure that utilizes the atmospheric pressure to hold the tape against the operational surface of the write head. The read head portion is provided to enable reading of the data immediately after it is written. The present head structure permits writing and reading of written data in both tape travel directions.

Although other modifications and changes may be suggested by those skilled in the art, it is the intention of the inventors to embody within the patent warranted hereon all changes and modifications as reasonably and properly come within the scope of their contribution to the art.

We claim:

1. A write head of a magnetic tape recording system, comprising:

a write head portion having gaps for writing data to a magnetic tape as the two are moved relative to one another, said write head portion having a tape contact surface; and a wear part having an edge disposed upstream of said write head portion relative to a tape travel direction, said wear part defining a tape contact surface that is substantially co-planar with said tape contact surface of said write head portion, said edge being disposed to provide a tape wrap angle of said magnetic tape to utilize atmospheric pressure to hold the tape against said write head portion;

wherein said write head portion is a first write head portion and said wear part is a first wear part;

a read portion adjacent said first write head portion on a side opposite said first wear part;

a second write head portion adjacent said read portion on a side opposite said first write head portion; and a second wear part adjacent said second write head portion on a side opposite said read portion, said first and second wear parts and said first and second write head portions and said read part having tape contact surfaces that are substantially co-planar so as to utilize atmospheric pressure to hold the tape against said write head portions during respective forward and reverse tape movement while providing read while write capability.

2. A write head as claimed in claim 1, further comprising:

a head platform on which said first and second write head portions and said first and second wear parts and said read portion are mounted, said first and second write head portions and said first and second wear parts being rotatable relative to said head platform.

\* \* \* \* \*